(12) United States Patent
Chen et al.

(10) Patent No.: US 11,934,294 B2
(45) Date of Patent: Mar. 19, 2024

(54) GENERATING AND DEBUGGING BYTECODE FOR A RULE

(71) Applicant: SAP SE, Walldorf (DE)

(72) Inventors: Wei Chen, Shanghai (CN); Pan Zhang, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/387,407

(22) Filed: Jul. 28, 2021

(65) Prior Publication Data

US 2023/0034567 A1     Feb. 2, 2023

(51) Int. Cl.
*G06F 8/40* (2018.01)
*G06F 8/41* (2018.01)
*G06F 11/36* (2006.01)

(52) U.S. Cl.
CPC ............ *G06F 11/3624* (2013.01); *G06F 8/41* (2013.01); *G06F 11/3656* (2013.01)

(58) Field of Classification Search
CPC ......... G06F 8/41; G06F 11/36; G06F 11/3624
See application file for complete search history.

(56) References Cited

U.S. PATENT DOCUMENTS

| | | | | |
|---|---|---|---|---|
| 5,170,464 A * | 12/1992 | Hayes | ...................... | G06N 5/04 706/45 |
| 2009/0183142 A1 * | 7/2009 | Hoban | ................ | G06F 11/3664 717/125 |
| 2015/0058824 A1 * | 2/2015 | Smiljanic | ............ | G06F 11/3664 717/125 |
| 2016/0299828 A1 * | 10/2016 | Nistor | ....................... | G06F 8/30 |
| 2017/0236067 A1 * | 8/2017 | Tjiong | .................. | G06F 3/0486 706/11 |
| 2018/0196736 A1 * | 7/2018 | Lincoln | ............... | G06F 11/3636 |
| 2019/0354463 A1 * | 11/2019 | Peck | ................... | G06F 11/3636 |
| 2021/0406774 A1 * | 12/2021 | Browne | .................... | G06F 8/36 |
| 2022/0100637 A1 * | 3/2022 | Koya | ................... | G06F 11/3624 |

OTHER PUBLICATIONS

S. Soomro et al., "A Framework for Debugging Java Programs in a Bytecode," 2018 International Conference on Computing, Electronics & Communications Engineering (iCCECE), Southend, UK, 2018, pp. 317-322, doi: 10.1109/iCCECOME.2018.8658589. (Year: 2018).*

* cited by examiner

*Primary Examiner* — Hanh Thi-Minh Bui
(74) *Attorney, Agent, or Firm* — SCHWEGMAN LUNDBERG & WOESSNER, P.A.

(57) ABSTRACT

Computer-readable media, methods, and systems are disclosed for generating and debugging bytecode for a rule including embedded debug functions. One or more predefined breakpoints are included in the embedded debug functions. When a breakpoint is reached, an execution state for the rule is stored including one or more local variables for the rule. Execution may be resumed by retrieving the stored execution state.

19 Claims, 11 Drawing Sheets

300 ─➤

IF user.employment.position.level = 'Engineer Level 1' THEN ─302 add(coursers, "engineer101");

ELSE IF user.employment.position.level = 'Manager Level 1' THEN add(coursers, "manager101");

END IF

```
public class GenRuleExecution extends BaseContainer implements Executable { public void execute(Map var1) {   /─306
    try {
      Object var2 = null;
      if (var1.get("user") != null) {
        var2 = var1.get("x");
      }

Object var3 = null;
      if (var1.get("courses") != null) {
        var3 = var1.get("y");
      }

Object var4 = resolveProperty(var2, "employement.position.level")

if (compareObject(var4, "engineer_level_1")) {
        Object var5 = resolveInstance("LMS:Course", "Engeineer 101");
        addToCollection(var3, var5);
      } else if (compareObject(var4, "manager_level_1")) {
        Object var6 = resolveInstance("LMS:Course", "Manager 101");
        addToCollection(var3, var6);
      } var1.put("user", var2);
      var1.put("courses", var3);
    } catch (Throwable var6) {
      throw var6;
    }
  }
}
```

```
public class GenRuleExecution extends BaseContainer implements Executable { public void execute(Map var1) {                    ╭─312
      try { if (RuleDebugger.isRestoreRequired()) {
          restoreState
          lookupswitch

}

Object var2 = null;
        if (var1.get("user") != null) {
          var2 = var1.get("x");
        }

Object var3 = null;
        if (var1.get("courses") != null) {
          var3 = var1.get("y");
318─╮                                        ╭─314
        }
        checkLineBreakPoint(1)
   L1:   Object var4 = resolveProperty(var2, "employement.position.level")

if (compareObject(var4, "engineer_level_1")) {
          checkLineBreakPoint(2)
          Object var5 = resolveInstance("LMS:Course", "Engeineer 101");
   L2:      addToCollection(var3, var5);
        } else {
          checkLineBreakPoint(3)
   L3:     if (compareObject(var4, "manager_level_1")) {
            checkLineBreakPoint(4)
   L4:       Object var6 = resolveInstance("LMS:Course", "Manager 101");
        addToCollection(var3, var6);
          }
        }

L5:   checkLineBreakPoint(5)
        var1.put("user", var2);
        var1.put("courses", var3);
        goto: end
      } catch (Throwable var6) {
        throw var6;
      }
      }                                    ╭─316
   Lq:   storeSessionAndQuit()
      }
    }
```

FIG. 3C

GENERATING AND DEBUGGING BYTECODE FOR A RULE

BACKGROUND

Typical software application solutions may utilize rules including processing logic to be implemented within an application. A rule is typically a short section of code in the application that performs a discrete operation or function. Such rules may be added or updated within the software in real-time where proper execution is critical. Accordingly, if the processing of the rules fails, the entire application may be slowed down or application processing may be halted.

In such software applications, it may be difficult to debug rules due to access issues and security concerns. For example, a remote debugger application may not have access to the application. Further, even if access is provided, the debugger may cause the entire application to slow down instead of a particular tenant or a particular task.

SUMMARY

Embodiments of the invention solve the above-mentioned problems by providing systems, methods, and computer-readable media for generating bytecode for a rule including debug functions for debugging the rule. In some embodiments, the debug functions comprise one or more breakpoints added to the bytecode as the bytecode is generated.

A first embodiment of the invention is directed to one or more non-transitory computer-readable media storing computer-executable instructions that, when executed by a processor, perform a method for debugging a rule, the method comprising initiating a debug session in response to receiving a debug request indicating a rule, retrieving an instance of the rule including a rule definition, compiling the rule so as to generate bytecode of the rule including an embedded breakpoint within the bytecode, initiating execution of the bytecode, pausing execution of the bytecode based on the breakpoint, storing an execution state for the bytecode including one or more local variables associated with the bytecode for the debug session, and resuming execution of the bytecode by retrieving the stored execution state.

A second embodiment of the invention is directed to a system for debugging a rule, the system comprising a rule data store, and a rule debug controller communicatively coupled to the rule data store, the rule debug controller including at least one processor programmed to perform a method comprising initiating a debug session in response to receiving a debug request indicating a rule, retrieving an instance of the rule including a rule definition, compiling the rule so as to generate bytecode of the rule including an embedded breakpoint within the bytecode, initiating execution of the bytecode, pausing execution of the bytecode based on the breakpoint, storing an execution state for the bytecode including one or more local variables associated with the bytecode for the debug session, and resuming execution of the bytecode by retrieving the stored execution state.

A third embodiment of the invention is directed to a method for debugging a rule, the method comprising initiating a debug session in response to receiving a debug request indicating a rule, retrieving an instance of the rule including a rule definition, compiling the rule so as to generate bytecode of the rule including an embedded breakpoint within the bytecode, initiating execution of the bytecode, pausing execution of the bytecode based on the breakpoint, storing an execution state for the bytecode including one or more local variables associated with the bytecode for the debug session, and resuming execution of the bytecode by retrieving the stored execution state.

Additional embodiments of the invention are directed to a graphical user interface associated with a rule debug controller and configured to generate a rule debug user interface to a user on a user device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 1 depicts an exemplary system architecture relating to some embodiments;

FIG. 2A-C depict a swim lane diagram illustrating an exemplary component responsibility flow relating to some embodiments;

FIG. 3A depicts an exemplary rule definition relating to some embodiments;

FIG. 3B depicts an exemplary compiled rule relating to some embodiments;

FIG. 3C depicts an exemplary compiled debug rule relating to some embodiments;

Figure 4A:
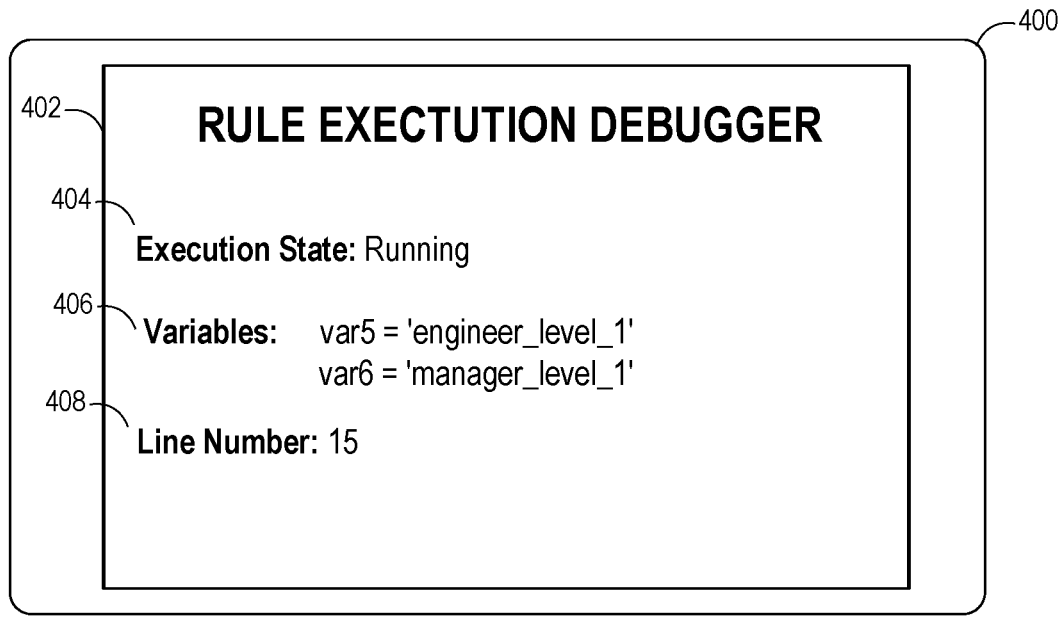
Figure 4B:
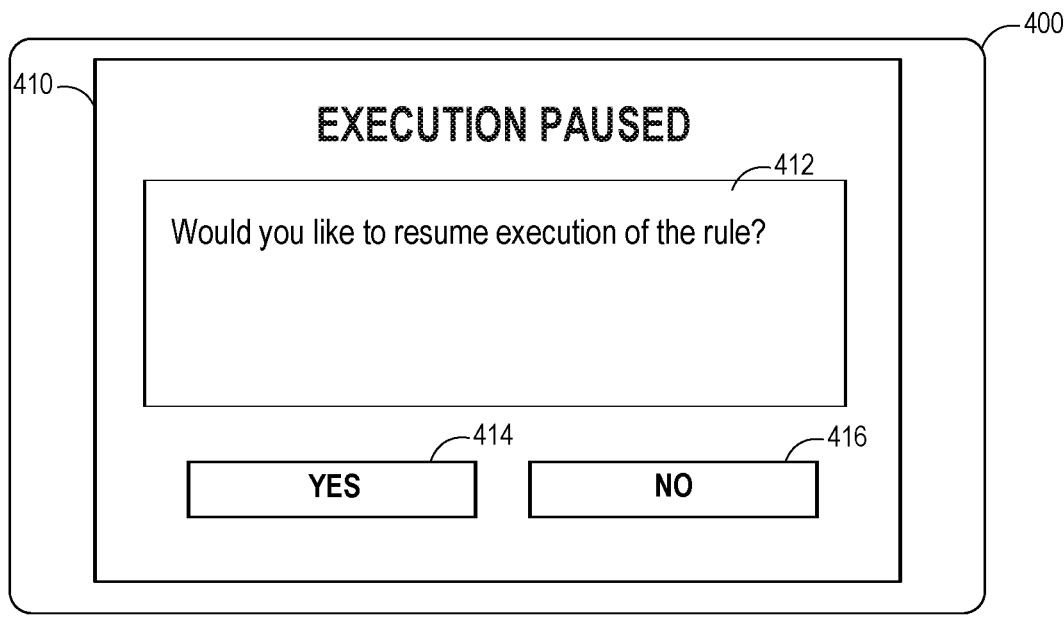
Figure 4C:
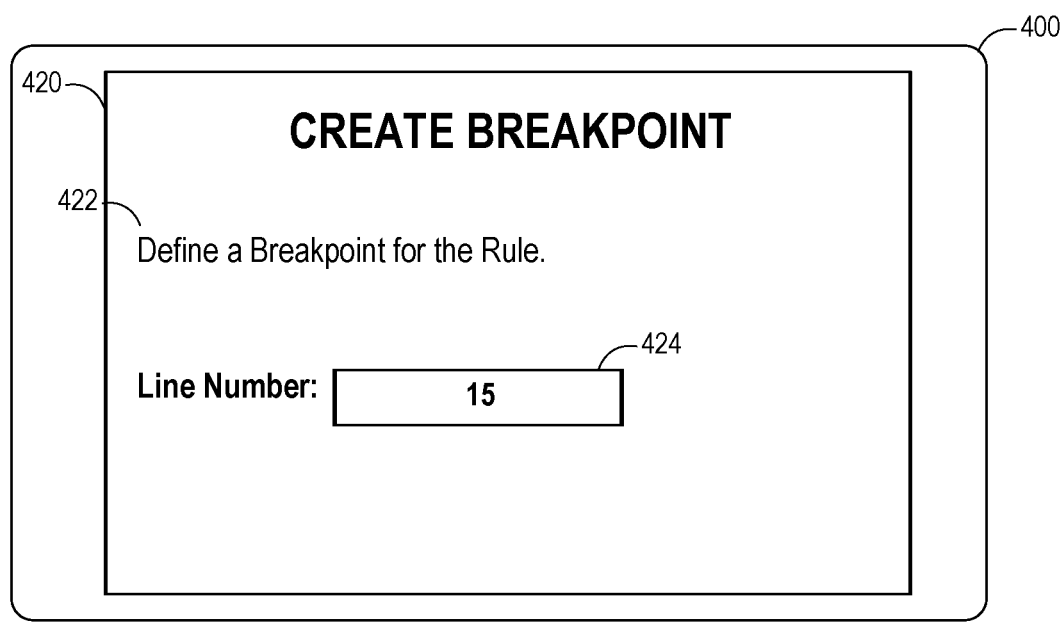
Figure 5:
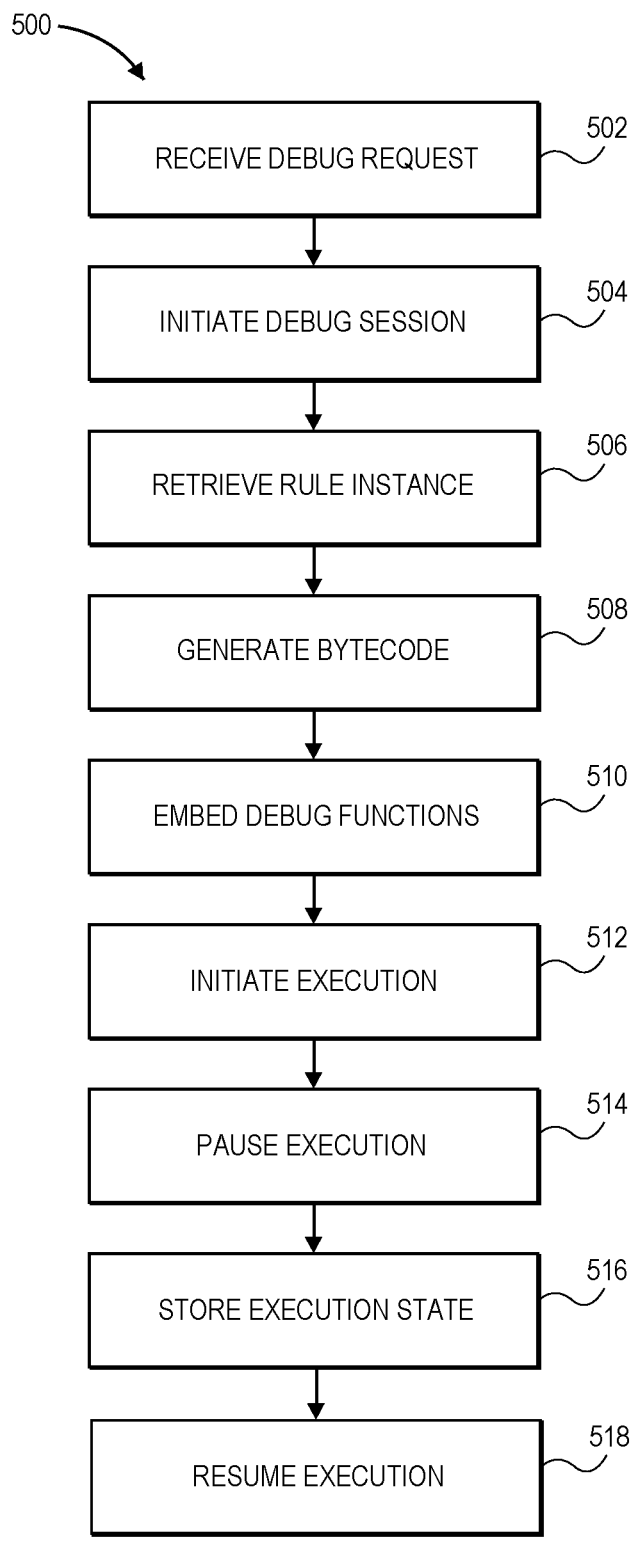
Figure 6:
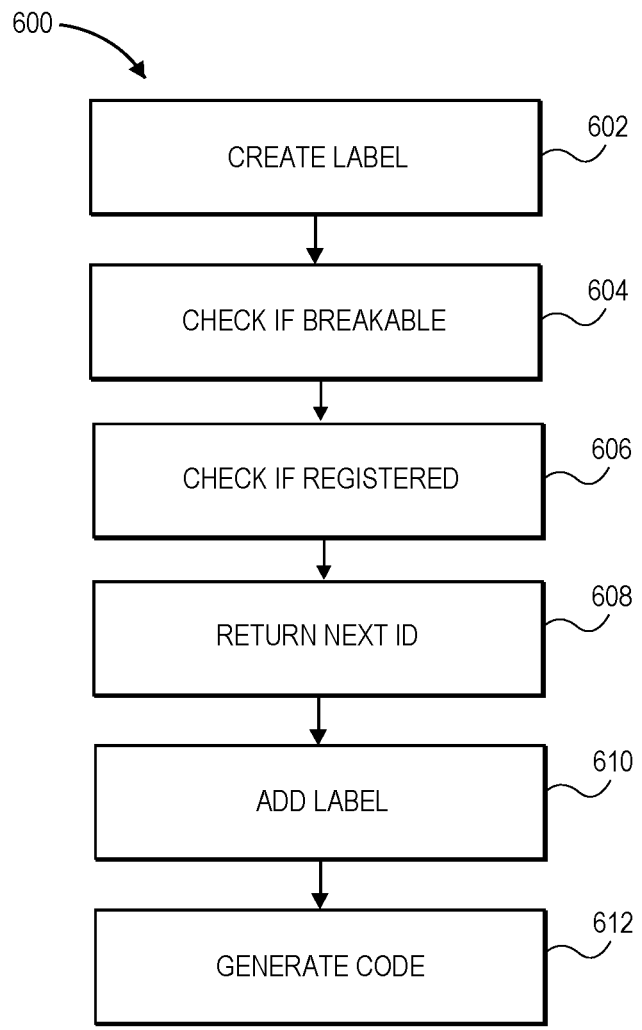
Figure 7:
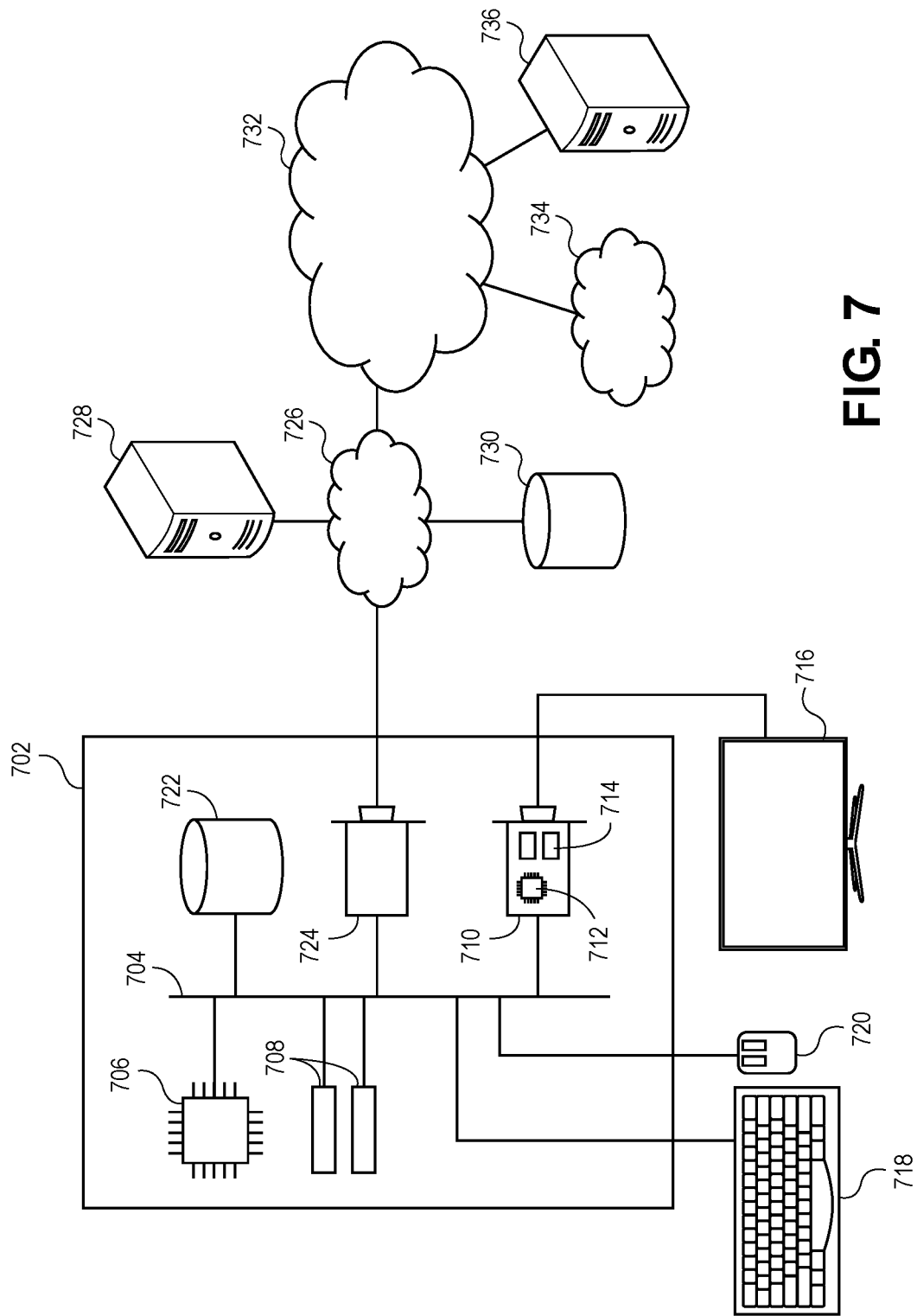

FIGS. 4A-C depict a graphical user interface relating to some embodiments;

FIG. 5 depicts a method for debugging a rule relating to some embodiments;

FIG. 6 depicts a method for generating debug code relating to some embodiments; and FIG. 7 depicts an exemplary hardware platform relating to some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1:
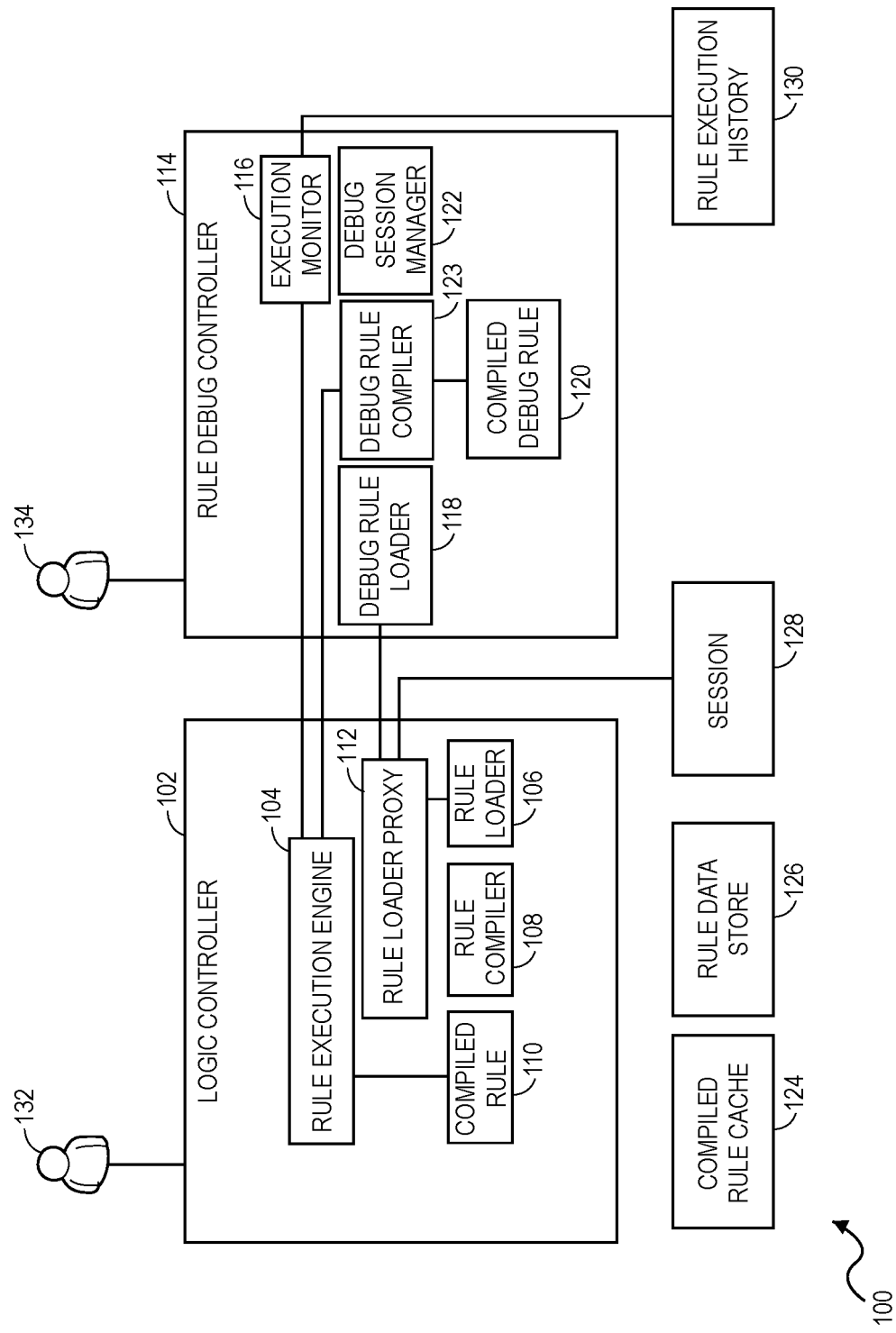

Turning first to FIG. 1, an exemplary system architecture relating to some embodiments is depicted and referred to generally by reference numeral 100. In some such embodiments, the system 100 includes a logic controller 102 which may be a business logic controller. For example, in some embodiments, the logic controller 102 is a business logic controller configured to execute rules relating to business software. In one example, the logic controller 102 may be employed to manage role information within a business environment. However, other applications of the logic controller 102 not explicitly described herein are also contemplated.

In some embodiments, the logic controller 102 includes a rule execution engine 104 for executing rules compiled within the logic controller 102. The logic controller 102 may further comprise a rule loader 106, a rule compiler 108, and a compiled rule 110 retrieved and loaded by the rule loader 106 and compiled by the rule compiler 108. In some embodiments, at least a portion of the components described herein may be shared by the logic controller 102 and the rule debug controller 114. For example, the rule execution engine 104 may be a shared resource such that the rule execution engine 104 may be called upon by either of the logic controller 102 and the rule debug controller 114. In some embodiments, the logic controller 102 may be configured to execute a rule within an application in a standard execution mode, while the rule debug controller 114 is configured to execute a rule external from the application in a debug execution mode. Further, in some embodiments, the rule compiler 108 is also a shared resource such that in a standard execution mode the rule compiler 108 compiles normal bytecode while in the debug execution mode the rule compiler 108 compiles debug bytecode including debugging functions such as breakpoints.

In some embodiments, the rule loader 106 receives the rule from at least one data store which may be either external or internal to the logic controller 102. For example, in some embodiments, the logic controller may further comprise a local data store for storing information such as rules and rule related information. Additionally, in some embodiments, the logic controller 102 further comprises a rule loader proxy 112 which may interface with the rule loader 106 to load the rule based on an execution type. In some embodiments, the rule loader proxy 112 determines which rule loader to use based on an execution mode. For example, the rule loader proxy 112 may use the rule loader 106 in a normal execution mode and use the debug rule loader 118 in a debug execution mode. Alternatively, in some embodiments, rule loader 106 may interface with the debug rule loader 118 such that a rule loaded on the rule loader 106 is transferred to the debug rule loader 118. In some such embodiments, the transfer of the rule may be instructed by the rule loader proxy 112 based on the execution mode.

In some embodiments, the system 100 further comprises a rule debug controller 114 for reading and recording variables, executing a rule in a debug session, and debugging the rule. In some embodiments, the rule debug controller 114 may be communicatively coupled to the logic controller 102. Alternatively, in some embodiments, the rule debug controller 114 and the logic controller 102 may be executed on a common processor. In some embodiments, the rule debug controller 114 comprises an execution monitor 116, a debug rule loader 118, a compiled debug rule 120, and a debug session manager 122, and a debug rule compiler 123. In some such embodiments, the execution monitor 116 records an execution history for the rule as well as recording and reading debug requests for the rule.

In some embodiments, the execution monitor 116 may initiate recording of a rule execution in response to detecting a problem with the execution of a rule. Accordingly, a system time, at least one input, and at least one output for the rule may be recorded. In some embodiments, such parameters as the at least one input and output may be read by the rule debug controller 114 from the execution history during debugging without inputting new parameters. In some embodiments, it may be difficult for a user to input a specific parameter for a rule when debugging. Accordingly, it may be desirable to automatically recall at least one parameter of the rule execution history from a previous execution of the rule from the rule execution history data store 130 such that the compiled debug rule 120 can be executed.

In some embodiments, the debug rule compiler 123 generates breakpoints and other debug features while compiling the rule. Accordingly, the debug rule compiler 123 outputs the compiled debug rule 120 including bytecode with breakpoints and other debug functions embedded therein. As such, embodiments are contemplated in which, during a normal operation mode, the rule loader proxy 112 uses rule loader 106 to load compiled rule 110 either from compiled rule cache 124 or as a rule definition from the rule data store 126 which is subsequently compiled using the rule compiler 108. Alternatively, during a debug operation mode, in some embodiments, the rule loader proxy 112 uses the debug rule loader 118 to load the compiled debug rule 120 either from the compiled rule cache 124 as a precompiled rule or from the rule data store 126 as a rule definition which may then be compiled by the debug rule compiler 123. In some embodiments, the compiled rule cache 124 may be queried to look up a precompiled rule such that compiling does not need to be repeated if not necessary.

In some embodiments, the execution history comprises any combination of date and time of execution, CPU time spent while executing, data inputs and outputs relating to execution, and applications which called the rule. Further, in some embodiments, the rule execution history includes run time data associated with execution of the rule. In some embodiments, the execution history comprises debugging information associated with execution of a rule in debug mode. Alternatively, in some embodiments, the execution history may comprise information relating to execution of a rule in normal operation. For example, a set of local variables used in normal operation may be stored in the execution history and retrieved for debugging. Similarly, the debug rule loader 118 may load a rule definition for the rule and compile the rule definition into a debug mode to generate the compiled debug rule 120 which may be augmented with debugging capabilities such as breakpoints, which will be described in further detail below. In some embodiments, the rule definition comprises one or more lines of code for the rule which may include one or more expressions and statements. Additionally, in some embodiments, the debug session manager 122 may save or load an execution state for the rule using the debug rule loader 118. In some embodiments, the debug session manager 122 maintains session information for a plurality of debug sessions. The debug sessions may be initiated when a user triggers a debug operation and may ended based on the respective session being deleted, timed-out, or ended by a user. Further, in some embodiments, session information stored on the debug session manager 122 may comprise an execution state including one or more local variables, and a breakpoint ID or line number where execution was last paused. Accordingly, the debug session manager 122 may be operable to provide the execution state such that the rule does not need to be reloaded using the debug rule loader 118. As such, debug execution of the rule may resumed from the previous stopping point instead of starting from the beginning.

In some embodiments, the system 100 further comprises one or more data stores which may be external or internal to either of the logic controller 102 or the rule debug controller 114. In some embodiments, a compiled rule cache 124 may be included for storing compiled rule information. Similarly a rule data store 126 may be included for storing data relating to a plurality of rules, such as, rule definitions, code relating to rules, and rule metadata. In some embodiments, a session 128 may be generated by either of the logic controller 102 or the rule debug controller 114 for hosting execution of the rule. In some embodiments, the session 128 may be a debug session managed by the debug session manager 122. Embodiments are contemplated in which the debug session may be deleted after rule execution is completed.

In some embodiments, a rule execution history data store 130 may be included for storing historic rule execution information relating to one or more rules. In some embodiments, the rule execution history data store 130 stores an execution state for the rule including parameters, local variables, a line number, and metadata associated with the rule. In some embodiments, the rule execution history data store 130 further stores application execution information relating to the rule. Embodiments are contemplated in which one or more of the compiled rule cache 124, the rule data store 126, and the rule execution history data store 130 are combined into a combined data store. Further, embodiments are contemplated in which the data is distributed across a plurality of data stores.

In some embodiments, user 132 mostly interacts with logic controller 102 and user 134 may mostly interact with the rule debug controller 114. In such scenarios, user 132 may be acting like an end user customer of an application such that end user 132 is either writing a local business rule or executing a local business rule commensurate with running in an application. Similarly, user 134 may be acting as more of an administrator who has been tasked with correcting a perceived error in the business rule running inside an application. In such scenarios, users 132 and 134 may be employed by a single employer or two different employers. When users 132 and 134 are working for different employers, it is possible for user 134 to perform debugging analysis without impacting the underlying application, and rules associated with user 132, that are being concurrently executed by user 132. In some embodiments, either of users 132 or 134 may interact via a graphical user interface associated with the system 100, as will be described in further detail below. In some embodiments, the users 132 and 134 may view or input information to the system 100, for example, to request debugging of a rule, to view variables associated with a rule, and to stop or resume execution of a rule. In yet other embodiments, users 132 and 134 may be the same person.

In some embodiments, when execution of a given rule may be carried out within an execution thread. A given organization may only have a limited number of execution threads available. Accordingly, in some embodiments, it may be desirable to quit execution when a debug rule is paused at a breakpoint such that the thread is freed-up and available for use elsewhere such as servicing a normal operation of an application for another tenant. Here, the execution state may be stored on the debug session manager 122 until execution is resumed using the next available execution thread, which may or may not be the same execution thread previously used. Accordingly, processing resources such as execution threads are efficiently utilized and are not wasted by waiting at a breakpoint.

In some embodiments, multiple instances of a rule may be generated and/or executed simultaneously. For example, embodiments are contemplated in which an instance of the rule may be executed normally within the application while another instance of the same rule is executed as bytecode in debug mode using the rule debug controller 114. In some such embodiments, the rule may be executed in the application in association with the user 132 while the debug rule is executed in association with the user 134. Accordingly, embodiments are contemplated in which a first instance of a rule is executed in debug mode while a second instance of the rule is executed in parallel under a normal execution mode. In such embodiments, a first set of bytecode with embedded breakpoints is generated for the debug mode and a second set of bytecode without embedded breakpoints is generated for the normal mode.

In some embodiments, the rules may comprise one or more lines of code relating to an application. For example, embodiments are contemplated in which the rules comprise under one hundred lines of code. Further, in some embodiments, the rules comprise code written in Java Language or another programming language. In some embodiments, the rules comprise processing logic to be implemented on an application. In some embodiments, the rules may only comprise several or tens of lines of code such that the processing cost associated with generating bytecode for the rule is minimal and is not strenuous on a processing component.

In some embodiments, the rules instruct one or more decisions within a related application based on one or more conditions which may be input variables for the rule. For example, rules are contemplated for business software to determine attributes for user accounts based on a user role associated with each respective user account. As such, each individual business may construct its own set of business rules to be executed in conjunction with a software application. In a multi-tenant scenario, a first tenant may be debugging a business rule in accordance with this description while a second tenant may still execute the application and its own set of business rules. Accordingly, in some embodiments, it may be desirable to debug rules before they are executed within the application to prevent errors within the rule code from interfering with or crashing the application. In some embodiments, it may be desirable to execute rules in a debug mode whenever a new rule is added or when code for a rule is updated or removed. Further, execution of the rules within the debug mode may be desirable because of the relatively small computing power and processing time associated with executing the code of the rule which is typically under one hundred lines compared to executing the entire application along with the associated stack variables. As such, embodiments are contemplated in which a rule may be executed in a rule debugger that is distinct from a primary application for which the rule is intended, such that execution and debugging of the rule does not interfere with the primary application.

Figure 2A:
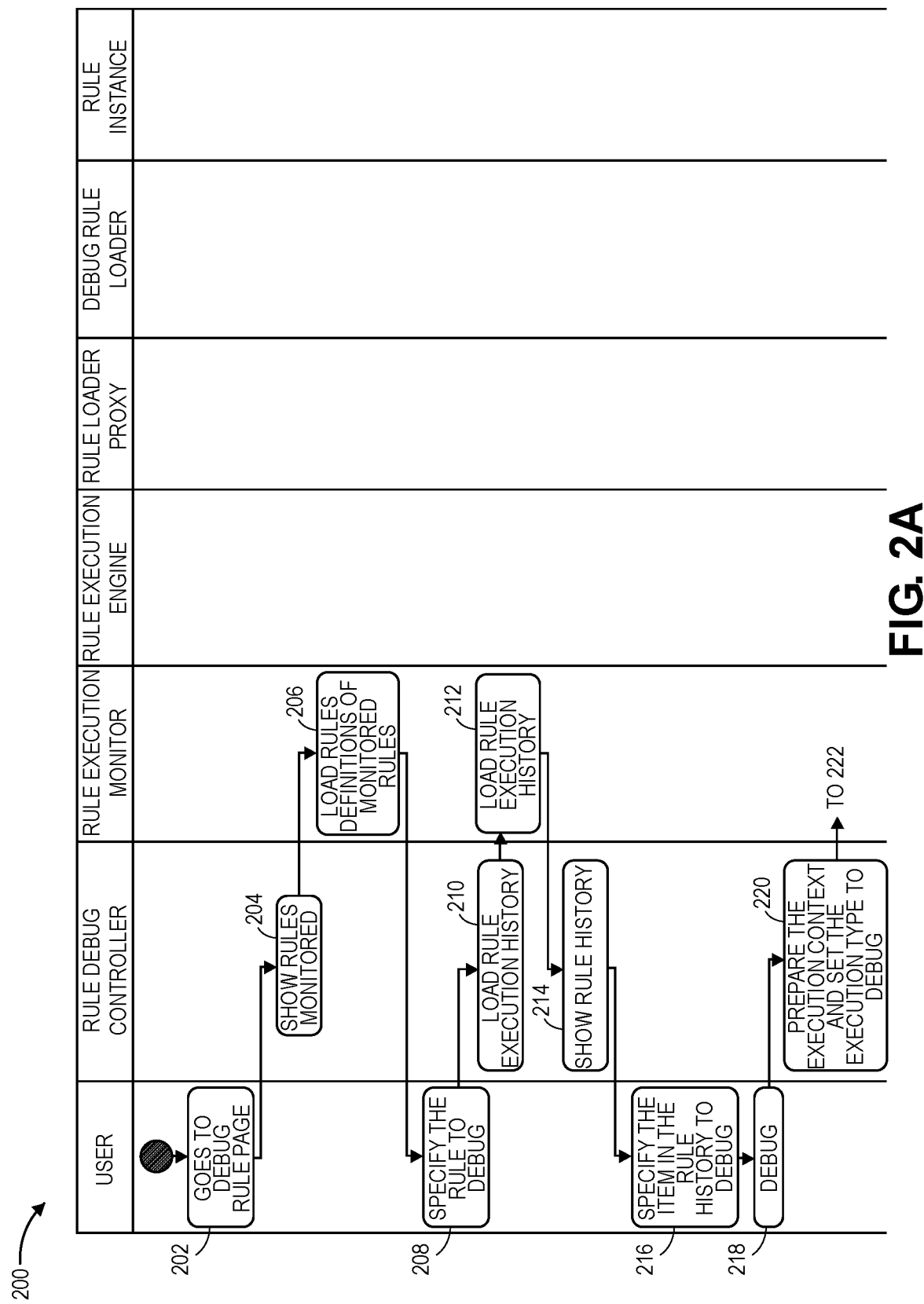
Figure 2B:
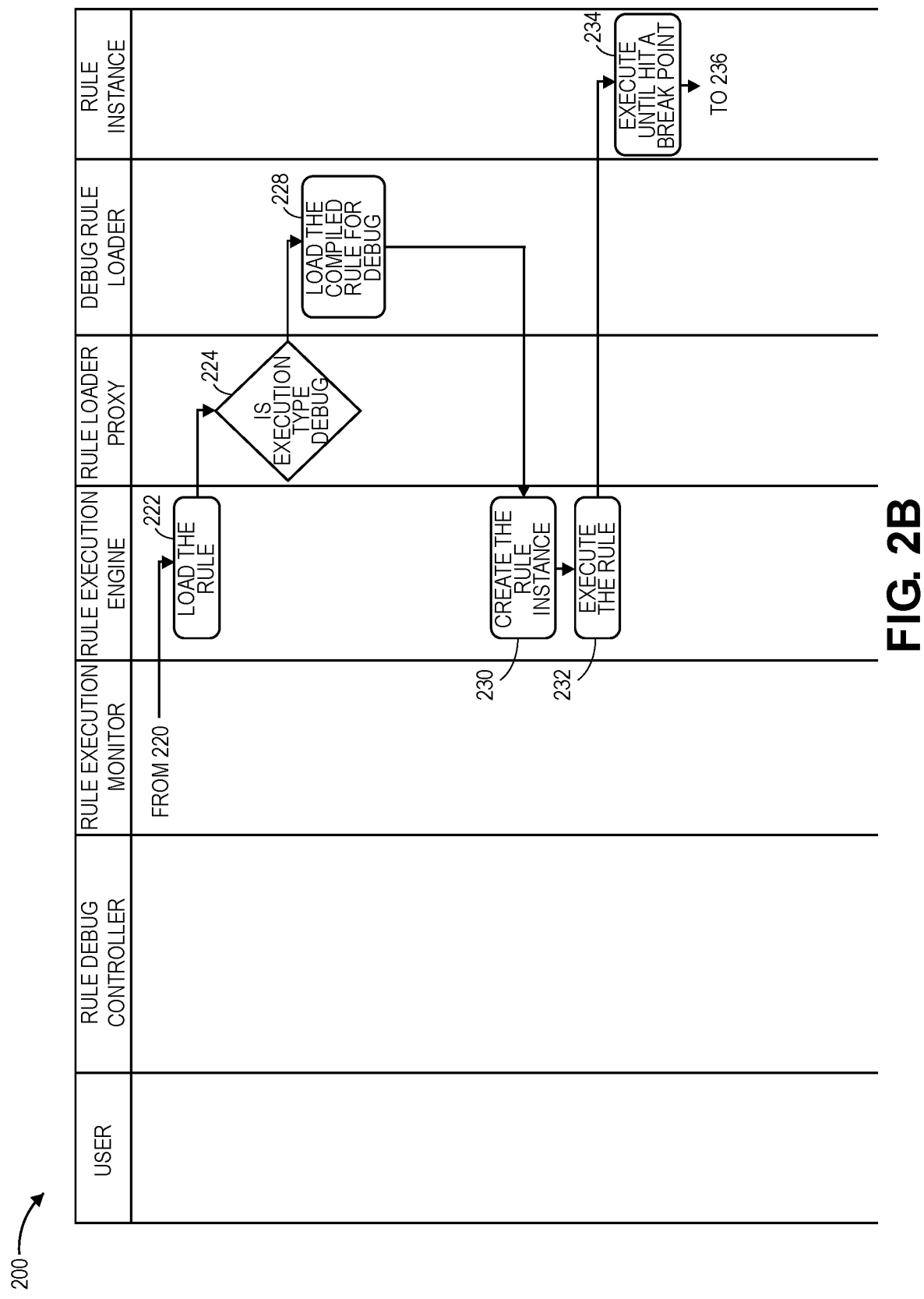
Figure 2C:
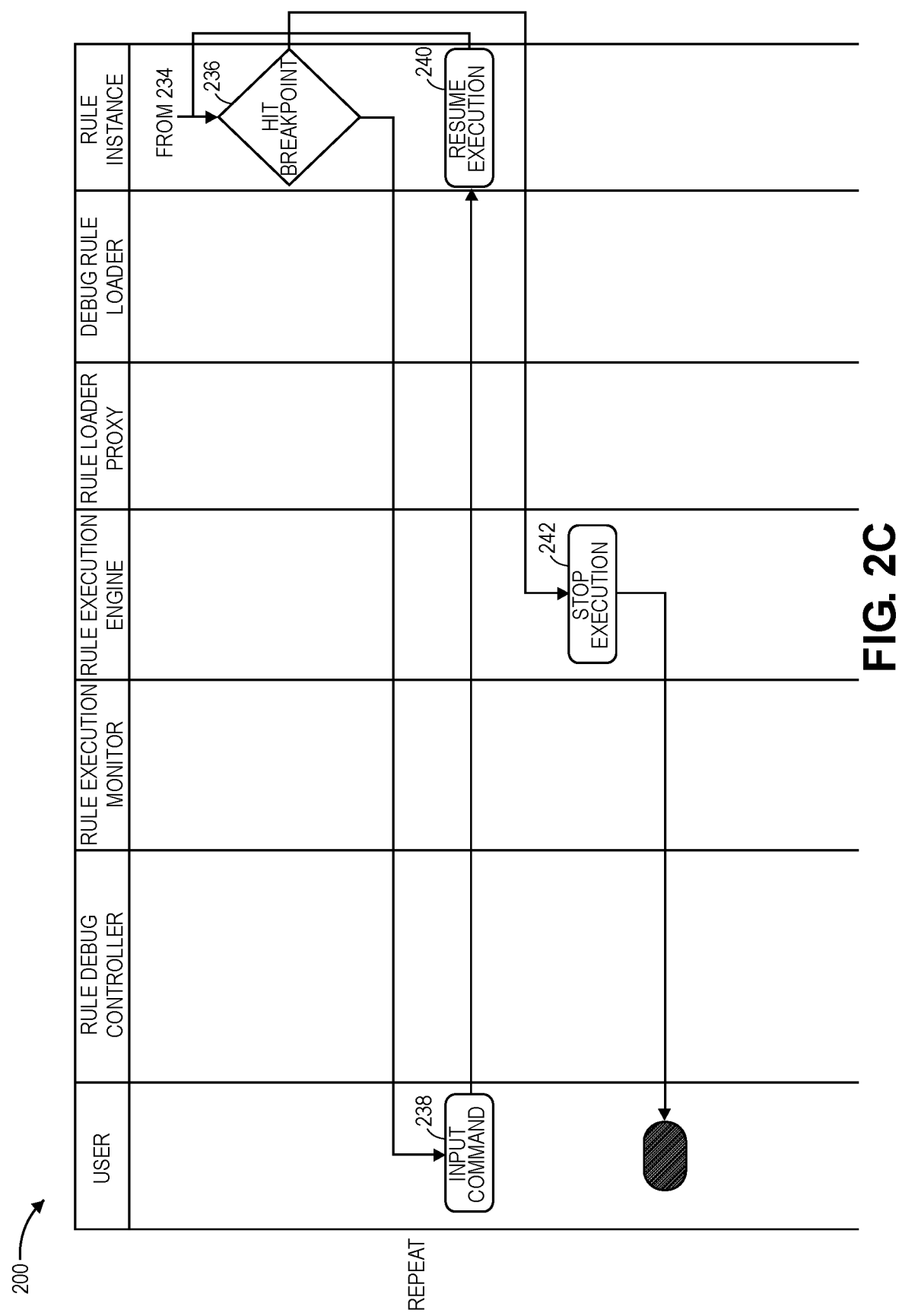

Turning now to FIGS. 2A-C, a swim lane diagram 200 illustrating a component responsibility flow is depicted relating to some embodiments. In some embodiments, the steps of the swim lane diagram 200 may be carried out by a plurality of specific components from the system 100, as shown. However, it should be understood that, in some embodiments, various alternative component flows are also contemplated. For example, in one embodiment, a function may be performed by the execution monitor 116, while in another embodiment that same function may be performed using a different component of system 100.

At step 202 a user, which may be either of user 132 or user 134, accesses a debug rule page. For example, in some embodiments, the user 134 accesses the page via a graphical user interface associated with the rule debug controller 114. At step 204 the rule debug controller 114 identifies and shows a plurality of monitored rules. In one embodiment, a rule becomes a monitored rule when a user such as 134 selects the particular rule for monitoring. Once a rule is selected for monitoring, its execution history can be collected by execution monitor 116, if not automatically collected for all rules, until such time as a user, such as 134, accessed the debug rule page. Alternatively, in some embodiments, a rule may be monitored automatically based on a detected issue associated with the rule. For example, if a rule is timed-out or associated with an infinite loop the rule may be monitored and an execution state may be saved. At step 206 the rule execution monitor 116 retrieves and loads rule definitions relating to the plurality of monitored rules. In some embodiments, the monitored rules and the rule definitions associated with each of the monitored rules may be retrieved from rule data store 126 or from the rule execution history data store 130 using either of the rule loader 106 or the debug rule loader 118. Alternatively, embodiments are contemplated in which the monitored rules and rule definitions are stored in a local storage of the rule debug controller 114.

At step 208 the user may specify a specific rule of the plurality of monitored rules to debug. In some embodiments, the user may select the specific rule from a list of monitored rules which may also include the retrieved rule definitions for each rule. In some embodiments, the user may submit a request identifying a specific rule to be debugged with a rule identifier. Accordingly, at step 210 the rule debug controller 114 loads a rule execution history associated with the specific rule. In some embodiments, the rule execution history may be retrieved from the rule execution history data store 130. In some embodiments, it may be desirable to allow users to select rules for which debugging should be enabled. For example, a user may select one or more rules to enable debugging functions from a list of rules. Further, in some embodiments, a user may specify a set of rules which should be monitored. Accordingly, embodiments are contemplated in which the set of rules may be automatically monitored, such that when any of the monitored rules are edited or updated the rule debug controller 114 automatically initiates a debugging execution on the updated rule.

At step 212, in some embodiments, the rule execution monitor 116 also loads the rule execution history. In some such embodiments, the rule execution history may be passed from the rule debug controller 114 or retrieved again directly from the rule execution history data store 130. At step 214 the rule debug controller 114 shows the rule history based on the loaded rule history. In some embodiments, the rule history may be displayed on a graphical user interface to the user 134. At step 216 the user specifies an item associated with the rule selected in step 208 that has been stored within the rule history to debug. For example, the user may select a specific execution instance of the rule or a specific line number of the rule to start debugging. Accordingly, the user may have the options to start execution of the rule from the beginning or to resume execution from a previously paused execution state of the rule. Embodiments are contemplated in which the rule execution history data store 130 stores a plurality of different execution states for a given rule such that the user may select to continue execution from any of the saved execution states. In some embodiments, storing multiple execution states for a given rule may be desirable to debug specific portions of the rule or to save execution processing time by selecting the furthest progressed execution state.

At step 218 the user may submit a debug request to the rule debug controller 114 to initiate debugging execution of the specified rule at the specified execution state. In some embodiments, the debug request is sent via an application programming interface (API) or a user interface (UI) and triggers execution of the rule by the rule execution engine 104. Accordingly, at step 220 the rule debug controller 114 prepares an execution context and sets an execution type for the rule to a debug mode. In some embodiments, the execution context comprises information associated with the execution state such as the line number, local variables, and variable metadata. In some embodiments, the execution type for the rule may be set to either of a normal mode or debug mode. In the normal mode, the rule executes as usual without any breakpoints. Accordingly, when executed in the normal mode, the rule may interfere with external stack variables of a running application. In the debug mode, the rule is executed separately from the running application and may include a plurality of breakpoints such that execution of the rule can be paused and resumed at the user's discretion.

At step 222 the rule is loaded by the rule execution engine 104 for example using either of the rule loader 106 or the debug rule loader 118. At step 224 the rule loader proxy 112 determines whether the execution type of the rule is set to debug mode. If the execution type is debug mode, the debug rule loader 118 loads the compiled rule for debug at step 228. At step 230 an instance of the rule is created based on the compiled debug rule. In some embodiments, the rule execution engine 104 generates debug bytecode on demand for the rule. Alternatively, in some embodiments, bytecode for monitored rules may be generated before-hand and stored in a data store such as the rule execution history data store 130.

At step 232 execution of the compiled rule 120 is executed using the rule execution engine 104. At step 234 the rule 120 executes until a breakpoint in the rule is reached. At step 236 it is determined whether a breakpoint has been reached. If a breakpoint has been reached, the user may be prompted to input a command to either resume execution of the rule or end execution. Accordingly, an input command is received from the user at step 238. Provided that the user selects to resume execution via the input command, execution of the rule 120 is resumed at step 240 and returns to step 234. If no breakpoint is reached at step 236, execution is stopped by the rule execution engine 104 at step 242.

In some embodiments, steps 234-240 may be repeated a number of times. Accordingly, the rule may execute through a plurality of lines of code for the rule and hit a plurality of breakpoints. Alternatively, embodiments are contemplated in which a given rule may comprise only one breakpoint such that steps 234-240 are only executed once. Further, in some embodiments, any of steps 202-240 may be repeated. For example, embodiments are contemplated in which the steps are executed with respect to one or more rules such that said steps may be repeated for each rule. In some embodiments, at least a portion of the steps may be performed automatically. For example, in some embodiments, the steps of FIGS. 2A-C may be automatically iterated for a plurality of rules to debug each of said plurality of rules. In some such embodiments, a rule data store may be monitored such that whenever a new rule is added or an existing rule is modified the rule is automatically debugged.

In some embodiments, after execution is stopped, a report may be generated for display to the user indicating either successful completion of the rule or a problem in the execution of the rule. Accordingly, the user may review the execution history of the rule to troubleshoot the rule and properly debug the rule. In some embodiments, at least a portion of the steps described herein with respect to a user may be performed automatically, for example, using a machine learning algorithm trained to interface with the rule debug controller 114 and troubleshoot rules. Alternatively, in some embodiments, the UI may submit requests to the rule execution engine 104 for variables and stacks. Accordingly, the rule execution engine 104 may receive the requests and return the one or more variables and stack information to the UI, which may present the one or more variables and stack information to a user via a graphical user interface. In some embodiments, additional rule execution data objects may be retrieved such as the execution state, line number, and other rule parameters.

Turning now to FIG. 3A, an exemplary rule definition 300 is depicted relating to some embodiments. In some such embodiments, the rule definition 300 may be a rule definition retrieved from the rule data store 126 using either of the rule loader 106 or the debug rule loader 118 before compiling. Accordingly, in some embodiments, the rule definition 300 comprises one or more lines of code 302 including one or more statements and expressions relating to the rule.

Turning now to FIG. 3B, an exemplary compiled rule 304 is depicted relating to some embodiments. In some embodiments, the compiled rule 304 may be a rule loaded and compiled in the normal operation mode without embedded debug breakpoints. Further, in some embodiments, the compiled rule 304 is the rule compiled by rule compiler 108. Accordingly, the compiled rule 304 may comprise one or more lines of code 306. In some embodiments, the compiled rule 304 may be a business rule for managing user information for a user. For example, the compiled rule 304 may read variables from a parameters map and include business logic to determine an output based on the variables. After the business logic is executed, the variables may be updated if necessary and returned to the parameters map. However, it should be understood that any number of rules may be included relating to a variety of different software functionalities.

Turning now to FIG. 3C, an exemplary compiled debug rule 310 is depicted relating to some embodiments. Similarly to the compiled rule 304, the compiled debug rule 310 comprises one or more lines of code 312. However, in some embodiments, the compiled debug rule 310 further comprises embedded debug functions, such as one or more breakpoints 314 placed within the one or more lines of code 312. In some embodiments, the compiled debug rule 310 is loaded by the debug rule loader 118 and compiled using the debug rule compiler 123 based on the rule loader proxy 112 determining that a debug mode is selected. Alternatively, in some embodiments, the compiled debug rule 310 may be compiled using the rule compiler 108. Accordingly, the rule loader proxy 112 may instruct the rule compiler 108 to compile the compiled debug rule 310 based on a debug mode. In some embodiments, the one or more breakpoints 314 are operable to interrupt and quit execution of the rule at an exit-point and save the execution state, as described herein. Accordingly, embodiments are contemplated in which the execution state of the rule may be restored and loaded such that the execution may be resumed at the previous exit-point. Additionally, in some embodiments, the compiled debug rule 310 further comprises a session quit function 316 for storing session information and ending execution of the compiled debug rule 310.

In some embodiments, the compiled debug rule 310 comprises line number indicators 318 indicating the specific line number of the one or more lines of code 312 which may be used to identify specific lines within the compiled debug rule 310. For example, if the compiled debug rule 310 reaches a breakpoint 314 and pauses, then the line number at which the execution stopped may be identified using the line number indicator 318. In some embodiments, the line number indicators 318 may be distributed such that only lines including a breakable expression receive a line number indicator 318. Alternatively, in some embodiments, line number indicators 318 may be placed at every line or on lines with a particular functionality. In some embodiments, it may be desirable to separate each independently breakable line with a different line number indicator 318 such that the specific point where the execution is broken, paused, or resumed can be identified.

In some embodiments, either of the compiled rule 304 or the compiled debug rule 310 may include bytecode. For example, in some embodiments, the original code in the rule may be converted into bytecode. In some such embodiments, the breakpoints 314 may be added when the code is converted into bytecode. Further, in some embodiments, it may be desirable to convert at least a portion of the code within the rule to bytecode such that the rule is more efficiently stored and executed. Further still, in some embodiments, the bytecode is more compact when compared to the original lines of code.

Turning now to FIGS. 4A-C, a graphical user interface (GUI) 400 is depicted relating to some embodiments. FIG. 4A shows the GUI 400 including a rule debug user interface 402. In some embodiments, the rule debug user interface 402 may be generated for display on a user device of one of users 132 or 134 during debug execution of a rule. In some embodiments, the rule debug user interface 402 comprises a current execution state indication 404 of the rule, a variables indication 406 indicating information relating to the one or more local variables of the rule, and a current line number indication 408 indicating the current line number being executed of the rule. Accordingly, the user may use the rule debug user interface 402 to monitor the execution of the debugging process of the rule. In some embodiments, the current execution state indication 404 may be any of paused, running, or loading such that users may be able to monitor the execution of the rule. In some embodiments, the rule debug user interface 402 receives information from the execution monitor 116 or the rule execution engine 104 to be displayed on the GUI 400.

FIG. 4B shows the GUI 400 including an execution prompt 410 relating to some embodiments. In some such embodiments, the execution prompt 410 may be generated for display on the GUI 400 in response to the execution of the rule reaching a breakpoint 314. Accordingly, the execution of the rule may be paused and the execution prompt 410 may be generated for display to a user. In some embodiments, the execution prompt 410 comprises a description 412 which may include text asking the user whether the execution should be resumed, as shown. Additionally, the execution prompt 410 further comprises a resume option 414 and an end option 416. The resume option 414 may be an interface object in the GUI 400 that, when selected, resumes execution of the rule. The end option 416 may be an interface object in the GUI 400 that, when selected, ends execution of the rule and exits the rule debug session.

In some embodiments, the execution prompt 410 may further include an option to adjust the rule. For example, in some embodiments, it may be desirable to allow users to alter code within the rule while the rule is paused. Accordingly, the user may add or update lines of code for the rule which may be converted into bytecode as described herein. In some such embodiments, only subsequent lines of code may be altered such that users cannot alter code which has already executed to prevent errors from evading debugging. Alternatively, in some embodiments, rules may not be altered while execution is paused such that when a rule is changed the rule is reloaded and execution starts over.

FIG. 4C shows a breakpoint definition user interface 420 relating to some embodiments. The breakpoint definition user interface 420 may be generated for display in the GUI 400, as shown, to allow a user to create a user defined breakpoint to be added to the code of the rule. Accordingly, the breakpoint definition user interface 420 may comprise a description 422 including text asking the user to define a breakpoint, as shown. In some embodiments, the breakpoint definition user interface 420 may be displayed before a rule is executed. For example, users may not be able to add breakpoints during execution of the rule. Accordingly, breakpoints may be added after a rule has been loaded, before the rule has been converted to bytecode or at another suitable time.

In some embodiments, the breakpoint definition user interface 420 may include a line number entry field 424 allowing the user to type or select a specific line number where the breakpoint should be included. Alternatively, in some embodiments, the user may be allowed to edit the code of the rule directly to input breakpoints. Further still, embodiments are contemplated in which the user who originally typed the lines of code for the rule includes breakpoints or breakpoint indicators within the original code of the rule. In such embodiments, a breakpoint may be added based on the breakpoint indicator when the code is converted into bytecode. In some embodiments, a breakpoint request may be generated in response to the user defining a breakpoint using the breakpoint definition user interface 420. Accordingly, the breakpoint request may include a rule identifier identifying a specific rule and a line number indicating the intended location of the breakpoint. Thus, a new breakpoint may be defined based on the breakpoint request.

In some embodiments, the GUI 400 may appear different than as shown in FIGS. 4A-C. For example, the GUI 400 may display different information or may show the same information rearranged based on user preference. Accordingly, embodiments are contemplated in which a variety of different rule debug information is presented on the GUI 400 in a variety of different forms. For example, in some embodiments, rule debug information may be presented to a user via a notification interface or some other suitable interface. Further, embodiments are contemplated in which the GUI 400 may be absent. Accordingly, in some embodiments, information related to the debug execution of a rule may be accessed via a command window. Additionally, in some embodiments, at least a portion of the operation of the system 100 may occur autonomously such that a GUI 400 may not be necessary.

Turning now to FIG. 5, a method 500 for debugging a rule is depicted relating to some embodiments. In some embodiments, at least a portion of the steps of method 500 may be performed on one or more of the components of the system 100 described with respect to FIG. 1. In some embodiments, at least a portion of the steps may be performed by a processor associated with the system 100. For example, in some embodiments, at least a portion of the steps of the method 500 may be performed by a processor of the rule execution engine 104. Alternatively, in some embodiments, processing may be divided such that some steps are performed by a first processor and some steps are performed by a second processor.

At step 502 a debug request is received. In some embodiments, the debug request may be received in response to a user input or command. For example, in some embodiments, the debug request may be received in response to a user selecting a rule and selecting a debug option from a GUI such as GUI 400. Alternatively, in some embodiments, a debug request may be transmitted automatically in response to a rule being updated or a new rule being added. In some embodiments, the debug request includes an indication of a specific rule to be debugged. At step 504 a debug session is initiated in response to the received debug request. In some embodiments, the debug session is initiated for a rule indicated within the debug request.

At step 506 an instance of a rule is retrieved based on the debug request. In some embodiments, the rule indicated in the debug request is retrieved. For example, in some embodiments, the rule instance may be retrieved from the rule data store 126. In some embodiments, the rule instance comprises a rule identifier and a rule definition including one or more lines of code for the rule. Embodiments are contemplated in which multiple rule instances of the same rule may be created and executed simultaneously. For example, in some embodiments, a first instance of a rule may be executed in the debug mode using the rule debug controller 114 while a second instance of the rule is executed in the normal mode using the logic controller 102. Further, in some embodiments, rule instances may be differentiated by an execution progress for the respective rule instance. For example, a first instance of a rule may have been partially executed and paused while a second instance of the same rule may not have been executed at all.

At step 508 bytecode is generated for the rule based at least in part on one of the rule definition or the lines of code for the rule. In some embodiments, each rule may comprise one or more parameters, one or more statements, and one or more expressions. Accordingly, bytecode may be generated for each parameter, statement, and expression within the rule. In some embodiments, an abstract syntax tree (AST) may be generated based on the original code and the AST may be parsed into bytecode to generate bytecode for the rule. In some embodiments, a parser may be included to parse the AST. In some such embodiments, the parser may be included as a component on one of the debug rule loader 118, the debug session manager 122 or another component of the system 100.

At step 510 debug functions are embedded into the rule. In some embodiments, the debug functions are embedded into the bytecode generated for the rule. In some such embodiments, the debug functions may be embedded into the bytecode as the bytecode is generated. Accordingly, embodiments are contemplated in which steps 508 and 510 are performed simultaneously such that the debug functions are embedded while the bytecode is being generated.

In some embodiments, the debug functions may be embedded automatically into the bytecode in various locations. For example, in some embodiments, all potential breakpoints are identified within the code using a machine learning algorithm or another automatic technique and breakpoints are placed in every potentially breakable location in the code. For example, in some embodiments, a machine learning algorithm may be included that is trained with historic execution data including known breakpoints. In some embodiments, the machine learning algorithm or another component may iteratively execute rules to identify potential breakpoints. For example, a rule may be executed iteratively using a range of variables and if an infinite loop is reached a breakpoint may be created. Further, in some embodiments, it may be desirable to set a time duration for the execution processing such that if execution exceeds the time duration a breakpoint is created. In some embodiments, the machine learning algorithm may be trained using rule execution history data from the rule execution history data store 130, which in some embodiments, may include execution data from normal operation of the rule. Alternatively, in some embodiments, the breakpoints may be manually identified by debug indicators already placed into the code such as the breakpoint indicators described above. For example, in some embodiments, the debug indicators may be manually typed into the code at potential breakpoints, as the code is written by a programmer. Further still, embodiments are contemplated in which a combination of manual and automatic techniques are used to identify breakpoints.

At step 512 execution of the rule is executed in the debug mode. In some embodiments, the rule may be executed by the rule execution engine 104. In some embodiments, once execution of the rule is initiated, the rule continues to execute until a breakpoint or some other debug function is reached. At step 514 execution of the rule is paused based on a predefined breakpoint embedded into the bytecode of the rule as a debugging function. At step 516 the execution state for the rule is stored upon pausing of execution. In some embodiments, the execution state includes one or more local variables associated with the rule for the debug session. In some embodiments, the execution state further includes one or more parameters for the rule, metadata associated with the one or more local variables, and a line number of the execution of the rule. In some embodiments, the execution state may be stored within the rule execution history data store 130.

At step 518 execution of the rule is resumed. In some embodiments, execution may be resumed in response to receiving an input or command from a user or some other entity to resume execution. For example, the execution of a rule may be resumed in response to a user selecting the resume option 414 from the GUI 400. In some embodiments, before resuming execution of the rule, the execution state is retrieved. Here, the same execution state stored at step 516 may be retrieved. In some embodiments, the execution state may be retrieved via a request thread as a normal request, such that there may not be a dedicated thread for serving debug requests. In some such embodiments, it may be desirable to send an execution state request over a general request thread such that the request will not impact or alter normal traffic over the general request thread. Alternatively, embodiments are contemplated in which a dedicated debug thread or execution state request thread is included. Accordingly, the retrieved execution state may include the local variables, the parameters, the metadata, and the line number for resuming execution of the rule. As such, when the execution is resumed the information from the stored execution state is restored such that execution may be resumed where last paused.

Turning now to FIG. 6, a method 600 for generating debug code for an expression node is depicted relating to some embodiments. In some embodiments, the method 600 may be performed for at least a portion of the lines of code of the rule. In some embodiments, the method 600 may be performed for each respective expression node within the lines of code of the rule. Accordingly, in some embodiments, one or more expressions may be identified within the rule. Further, in some embodiments, the method 600 may be performed with respect to one or more statements within the rule.

At step 602 a label may be created for the expression node. In some embodiments, the label identifies the respective expression node. For example, the label may identify the line number of the expression node or in some embodiments, the location of the expression node within a specific line of code. At step 604 it is determined whether the expression node is breakable. In some embodiments, breakpoints are manually defined by a user within the original code. Accordingly, a breakpoint indicator may be included in the original code such that the breakpoint indicator is identifiable within the AST and the bytecode to identify breakpoints within the rule.

In some embodiments, to determine if the expression node is breakable, a machine learning algorithm trained to identify potential breakpoints may be employed. Alternatively, in some embodiments, an iterative process may be used to identify potential breakpoints within the code. For example, the code may be iterated until an error is received or until an infinite loop has been identified. Accordingly, points of error and infinite loops may be classified as breakable. In some embodiments, breakpoints may be set automatically based on a set of predefined breakpoint conditions. For example, in some embodiments, breakpoints may be automatically set based at branchpoints in the AST, such as a loops or conditional statements. Breakpoints may also be placed at function invocations within the rule code, assignment points of variables within the rule code, or at specific line numbers. For example, in some embodiments, breakpoints are set at each line or every other line of the rule code. However, embodiments are contemplated in which breakpoints may be set at any increment of line numbers. Further, in some embodiments, the automatic breakpoint conditions may be configurable by a user such that the user may define where breakpoints should occur.

In some embodiments, if a breakpoint is not identified within the expression node, the expression may be generated into bytecode without debug functions such as breakpoints. For example, in some embodiments, not every expression within the rule code may be deemed breakable. Accordingly, embodiments are contemplated in which a given rule comprises code with a first portion of unbreakable expressions and statements and a second portions of breakable expressions and statements.

At step 606 it is determined whether the breakpoint has been previously registered as a breakpoint. If the breakpoint has already been registered the method may skip the remaining steps and generate the code including the previously registered breakpoint. If the breakpoint has not previously been registered the method will continue to step 608 where the next breakpoint identifier is returned for the identified breakpoint.

At step 610 one or more labels may be generated and added for the breakpoint. In some embodiments, the labels may be the label identifying the respective expression node as discussed with respect to step 602. Alternatively or additionally, labels may be included identifying the breakpoint as well as a resume label to jump to a resume point within the code. Further, in some embodiments, a label may be included to jump to an exception handling block. At step 612 the debug code is generated. In some embodiments, the debug code comprises each of bytecode corresponding to the original code and bytecode corresponding to the breakpoints and labels. In some embodiments, the generated code includes the breakpoints which are operable to pause execution of the rule and store the execution state, as described herein.

In some embodiments, any of the steps 602-612 described herein with respect to an expression or an expression node may also be performed for a statement. Accordingly, embodiments are contemplated in which debug bytecode may be generated for a number of lines of codes including both expressions and statements such that breakpoints may be included based on any of the expressions and statements.

Turning now to FIG. 7, an exemplary hardware platform for certain embodiments of the invention is depicted. Computer 702 can be a desktop computer, a laptop computer, a server computer, a mobile device such as a smartphone or tablet, or any other form factor of general- or special-purpose computing device. Depicted with computer 702 are several components, for illustrative purposes. In some embodiments, certain components may be arranged differently or absent. Additional components may also be present. Included in computer 702 is system bus 704, whereby other components of computer 702 can communicate with each other. In certain embodiments, there may be multiple busses or components may communicate with each other directly. Connected to system bus 704 is central processing unit (CPU) 706. Also attached to system bus 704 are one or more random-access memory (RAM) modules 708. Also attached to system bus 704 is graphics card 710. In some embodiments, graphics card 710 may not be a physically separate card, but rather may be integrated into the motherboard or the CPU 706. In some embodiments, graphics card 710 has a separate graphics-processing unit (GPU) 712, which can be used for graphics processing or for general purpose computing (GPGPU). Also on graphics card 710 is GPU memory 714. Connected (directly or indirectly) to graphics card 710 is display 716 for user interaction. In some embodiments no display is present, while in others it is integrated into computer 702. Similarly, peripherals such as keyboard 718 and mouse 720 are connected to system bus 704. Like display 716, these peripherals may be integrated into computer 702 or absent. Also connected to system bus 704 is local storage 722, which may be any form of computer-readable media, and may be internally installed in computer 702 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 724 is also attached to system bus 704 and allows computer 702 to communicate over a network such as network 726. NIC 724 can be any form of network interface known in the art, such as Ethernet, ATM, fiber, Bluetooth, or Wi-Fi (i.e., the IEEE 802.11 family of standards). NIC 724 connects computer 702 to local network 726, which may also include one or more other computers, such as computer 728, and network storage, such as data store 730. Generally, a data store such as data store 730 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 728, accessible on a local network such as local network 726, or remotely accessible over Internet 732. Local network 726 is in turn connected to Internet 732, which connects many networks such as local network 726, remote network 734 or directly attached computers such as computer 736. In some embodiments, computer 702 can itself be directly connected to Internet 732.

In some embodiments, any of the components described with respect to FIG. 7 may be included in the system 100. For example, in some embodiments, the rule debug controller 114 may include CPU 706 and local storage 722. Additionally, embodiments are contemplated where the computer 702 may be used to interact with the system 100. Accordingly, the GUI 400 may be generated for display on the display 716. Further, any of the components of system 100 communicate over a network such as local network 726 or over the internet 732. Additionally, any of the functionality described with respect to various embodiments may be carried out using a server computer including any of the hardware described with respect to computer 702.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for debugging a rule, the method comprising:

initiating a debug session in response to receiving a debug request indicating a rule;

retrieving an instance of the rule including a rule definition;

compiling the rule so as to generate bytecode of the rule including an embedded breakpoint within the bytecode, wherein a location within the bytecode for embedding the breakpoint is determined automatically using a machine learning algorithm trained with historic rule execution data;

initiating execution of the bytecode; pausing execution of the bytecode based on the breakpoint;

storing an execution state for the bytecode including one or more local variables associated with the bytecode for the debug session; and resuming execution of the bytecode by retrieving the stored execution state.

2. The media of claim 1, wherein execution of the rule is resumed based on a resume command received in response to a user input.

3. The media of claim 2, wherein the stored execution state is retrieved by locating a stored debug identifier and the rule instance associated with the execution state of the rule.

4. The media of claim 3, wherein the execution state of the rule further includes a line number for the rule indicative of where the rule was paused.

5. The media of claim 1, further comprising:

receiving a breakpoint request from a user comprising a rule identifier for identifying the rule and a line number; and defining a new breakpoint for the rule based on the breakpoint request.

6. The media of claim 1, wherein the bytecode is a first set of bytecode, the media further comprising compiling the rule so as to generate a second set of bytecode without debug functions, wherein the second set of bytecode is executed in parallel to the first set of bytecode.

7. A system for debugging a rule, the system comprising:

a rule data store; and a rule debug controller communicatively coupled to the rule data store, the rule debug controller including at least one processor programmed to perform a method comprising:

initiating a debug session in response to receiving a debug request indicating the rule;

retrieving an instance of the rule including a rule definition;

compiling the rule so as to generate bytecode of the rule including an embedded breakpoint within the bytecode, wherein a location within the bytecode for embedding the breakpoint is determined automatically using a machine learning algorithm trained with historic rule execution data;

initiating execution of the bytecode; pausing execution of the bytecode based on the breakpoint;

storing an execution state for the bytecode including one or more local variables associated with the bytecode for the debug session; and resuming execution of the bytecode by retrieving the stored execution state.

8. The system of claim 7, wherein the embedded breakpoint is automatically defined based on a set of code associated with the rule.

9. The system of claim 7, further comprising a graphical user interface associated with the rule debug controller configured to generate a rule debug user interface for display to a user on a user device.

10. The system of claim 9, wherein the rule debug user interface comprises an indication of the local variable associated with the rule for the debug session.

11. The system of claim 10, wherein the rule debug user interface further comprises a prompt for the user to resume or exit execution of the rule presented in response to the embedded breakpoint.

12. The system of claim 11, wherein the rule debug user interface further comprises an option for the user to define a new breakpoint for the rule.

13. The system of claim 12, wherein the execution state is stored within a historic execution state data store along with a plurality of selectable execution states for the rule.

14. A method for debugging a rule, the method comprising:

initiating a debug session in response to receiving a debug request indicating the rule;

retrieving an instance of the rule including a rule definition;

compiling the rule so as to generate bytecode of the rule including an embedded breakpoint within the bytecode, wherein a location within the bytecode for embedding the breakpoint is determined automatically using a machine learning algorithm trained with historic rule execution data;

initiating execution of the bytecode; pausing execution of the bytecode based on the breakpoint;

storing an execution state for the bytecode including one or more local variables associated with the bytecode for the debug session; and resuming execution of the bytecode by retrieving the stored execution state.

15. The method of claim 14, wherein the generated bytecode further comprises a portion relating to a set of original code for the rule.

16. The method of claim 15, wherein the execution state further includes a line number for the rule indicative of where the rule was paused.

17. The method of claim 16, wherein the execution state comprises one or more parameters for the rule, the one or more local variables, metadata associated with the one or more local variables, and the line number for resuming execution of the rule.

18. The method of claim 17, wherein the rule is executed in a rule debugger distinct from a primary application associated with the rule such that execution of the rule does not interfere with the primary application.

19. The method of claim 18, further comprising:

after retrieving the instance of the rule, parsing the rule with a parser in preparation for generating the bytecode for the rule.

* * * * *